(12) United States Patent
Clerc et al.

(10) Patent No.: US 6,524,744 B1
(45) Date of Patent: Feb. 25, 2003

(54) MULTI-PHASE MATERIAL AND ELECTRODES MADE THEREFROM

(75) Inventors: Daryl Clerc, Dexter, MI (US); Matthew Fay, Ypsilanti, MI (US); Jennifer Groff, Ann Arbor, MI (US); Michael Wixom, Ann Arbor, MI (US)

(73) Assignee: T/J Technologies, Inc., Ann Arbor, MI (US)

( * ) Notice: Subject to any disclaimer, the term of this patent is extended or adjusted under 35 U.S.C. 154(b) by 0 days.

(21) Appl. No.: 09/454,571

(22) Filed: Dec. 7, 1999

Related U.S. Application Data

(60) Provisional application No. 60/111,211, filed on Dec. 7, 1998, and provisional application No. 60/146,986, filed on Aug. 30, 1999.

(51) Int. Cl.$^7$ ................................................. H01M 4/58
(52) U.S. Cl. ..................................... 429/218.1; 429/209
(58) Field of Search ............................... 429/209, 218.1

(56) References Cited

U.S. PATENT DOCUMENTS

| | | | |
|---|---|---|---|
| 5,590,387 A | 12/1996 | Schmidt et al. | 419/36 |
| 5,610,853 A * | 3/1997 | Akiyama et al. | 365/117 |
| 5,840,111 A | 11/1998 | Wiederhöft et al. | 106/436 |
| 6,007,945 A * | 12/1999 | Jacobs et al. | 429/218.1 |
| 6,025,034 A | 2/2000 | Strutt et al. | 427/450 |
| 6,124,057 A * | 9/2000 | Ito et al. | 429/213 |
| 6,203,944 B1 | 3/2001 | Turner et al. | 429/218.1 |
| 6,260,248 B1 * | 7/2001 | Cramer et al. | 29/25.35 |

FOREIGN PATENT DOCUMENTS

| | | |
|---|---|---|
| JP | 4-026542 A | 1/1992 |
| WO | WO 99/49532 | 9/1999 |

OTHER PUBLICATIONS

Mavoori et al., New Creep Resistant Low Melting Point Solders, Journal of Electronic Materials, Nov. 1998, vol. 27, No. 11, pp. 1216–1222.

Winter et al. "Electrochemical lithiation of tin and tin-based intermetallics and composites" Electrochimica Acta 45 (1999 31–50.

Mao et al. "Mechanically Alloyed Sn–Fe(–C) Powders as Anode Materials for Li–Ion Batteries—III. Sn2Fe:SnFe3C Active/Inactive Composites" Journal of The Electrochemical Society 146(2) 423–427 (1999).

Mao et al. "Mechanically Alloyed Sn–Fe(–C) Powders as Anode Materials for Li–Ion Batteries—II. The Sn–Fe System" Journal of The Electrochemical Society 146(2) 414–422 (1999).

Mao et al. "Mechanically Alloyed Sn–Fe(–C) Powders as Anode Materials for Li–Ion Batteries—I. The Sn2Fe–C System" Journal of The Electrochemical Society 146(2) 405–413 (1999).

* cited by examiner

Primary Examiner—Carol Chaney
Assistant Examiner—Dah-Wei D. Yuan
(74) Attorney, Agent, or Firm—Gifford, Krass, Groh, Sprinkle, Anderson & Citkowski, P.C.

(57) ABSTRACT

A multiphase material comprises a ceramic matrix material having one or more of Sn, Sb, Bi, Pb, Ag, In, Si and Ge nanodispersed in the matrix. The ceramic matrix is preferably based upon carbides, nitrides and oxides of group IV–VI transition metals taken singly or in combination.

4 Claims, No Drawings

MULTI-PHASE MATERIAL AND ELECTRODES MADE THEREFROM

RELATED APPLICATION

This patent application claims priority of provisional patent application Ser. No. 60/111,211 filed Dec. 7, 1998, and provisional patent application No. 60/146,986 filed Aug. 30, 1999.

FIELD OF THE INVENTION

This invention relates generally to synthetic materials. More specifically, the invention relates to a multi-phase material comprised of a matrix of transition metal-based ceramic having one or more specific metals or semiconductors present as a nanodispersed phase therein. The invention also relates to electrodes incorporating these materials, and in particular to anodes for rechargeable lithium batteries.

BACKGROUND OF THE INVENTION

Rechargeable batteries are of ever increasing importance as power supplies for a variety of items. One important class of rechargeable batteries comprises rechargeable lithium batteries, and as used herein, the term is understood to include all types of rechargeable lithium and lithium ion batteries.

The anode is an important component of a lithium battery. During charging and discharging of the battery, lithium ions are inserted into, and removed from, the bulk of the anode material respectively. The performance and practicality of a lithium battery will depend, in a significant part, upon the properties of the materials comprising its electrodes. Anode materials for lithium batteries should have high charge capacity, and should provide a good rate of charge and discharge. In addition, the materials should have good stability with regard to both operational cycling and ambient conditions. Also, in order to be practical, the materials should be relatively low in cost.

Presently, anodes for rechargeable lithium batteries are generally graphite-based. Graphite is relatively low in cost; however, many of its performance characteristics are less than ideal. For example, graphite has relatively low volumetric capacity. As is understood in the art, volumetric capacity is a measure of the charge storing ability of a material on the basis of a given unit volume. As will be explained in detail herein below, the materials of the present invention have a volumetric capacity which is at least 3 to 5 fold greater than that of prior art graphite-based materials. It is also significant that the diffusion coefficient of lithium ions is far greater in the materials of the present invention than in graphite. Because of this high diffusion coefficient the discharge rate for batteries made in accord with the present invention is high, as compared to those of the prior art. Discharge rate is particularly important in applications requiring instantaneous high power such as radio and cell phone broadcasting, power tools, and the like.

A significant problem of graphite-based electrodes is that lithium can plate out on to the graphite material under overcharge conditions. This plating out can damage or destroy a battery in which it occurs, and can also present a significant hazard. The materials of the present invention have been found to be very resistant to plate out of lithium, even under relatively high overcharge conditions.

As will be explained in detail herein below, the multi-phase materials of the present invention include a matrix comprised of a transition metal-based ceramic, and the lattice structure of this matrix provides very good mechanical and chemical stability. As a result, the materials of the present invention inhibit migration of metal domains, and cells incorporating these materials manifest very low first cycle losses. As is understood in the art, first cycle loss refers to degradation of cell performance, in terms of capacity and discharge rate, which occurs as a result of the first charge/discharge cycle. This first cycle loss can be relatively large in cells of the prior art; and consequently, a predetermined amount of overcapacity must be built into prior art cells to account for first cycle losses. Since cells incorporating the electrode materials of the present invention have low first cycle losses, they do not require large overcapacities. In addition to operational stability, the materials of the present invention are quite stable to ambient atmospheric conditions; hence, design criteria, and manufacturing processes for cells incorporating the present materials are greatly simplified.

In addition to the foregoing, the materials of the present invention are manufactured from relatively low-cost starting materials. These and other advantages of the present invention will be apparent from the drawings, discussion and description which follow.

BRIEF DESCRIPTION OF THE INVENTION

There is disclosed herein a multi-phase material comprising a first phase which is a ceramic matrix material comprised of a compound of a group IV–VI transition metal. The compound is selected from the group consisting of nitrides, carbides, oxides, and combinations thereof. The material includes a second phase comprising a material selected from the group consisting of Sn, Sb, Bi, Pb, Ag, In, Si, Ge, and combinations thereof. This second phase is present as a nanodispersion in the matrix. In some embodiments, the second phase preferably includes tin, and may further include one or more alloying elements such as antimony. In some embodiments, the transition metal comprises Ti or V. The nanodispersed phase is typically present as regions having a size in the range 2,000–5,000 angstroms.

In some embodiments, the material is of the general formula: $T_x$, $A_{1-x}$, $B_y$, $O_z$, wherein T is one or more group IV–VI transition metals, A is selected from the group consisting of Sn, Sb, Bi, Pb, Ag, In, Si, Ge, and combinations thereof; B is carbon, nitrogen, or combinations thereof, and O is oxygen. The subscripts refer to atomic percentages of the various components, and x is in the range of 0.4–0.6; y is in the range of 0.2–0.6; z is in the range of 0.0–0.3, and the sum of y+z is in the range of 0.8x–1.2x. In one particularly preferred embodiment, A is a mixture of tin and antimony, and the antimony is present in the range of 0.01–0.05 atomic percent of the total material.

The present invention also includes anodes for lithium batteries which incorporate the foregoing materials.

DETAILED DESCRIPTION OF THE INVENTION

The material of the present invention is a multi-phase material having a first phase which is a ceramic matrix material, and a second phase which comprises one or more members chosen from a specific group of metals and semiconductors. The second phase is nanodispersed through the matrix. As is to be understood, within the context of this disclosure, a nanodispersion refers to a structure wherein relatively small regions of the second material are dispersed through the matrix. These regions of the second phase generally have a size below 10,000 angstroms, and are, in preferred embodiments, in the size range of 2,000–5,000 angstroms. It is to be understood that the material of the present invention may include some portions of the second phase which have a greater or smaller size. It is further to be understood that in some instances, some portions of the material from which the second phase is constituted, may actually be incorporated into the matrix and not nanodispersed; however, the materials of the present invention do include a nanodispersed phase, and as such are distinguished from prior art materials, which may include similar elements, but in which those elements are constituted as intermetallic compounds, and not as a two-phase material.

In general, the matrix material of the present invention is comprised of an early transition metal ceramic. As is to be understood, in the context of the disclosure, early transition metals are considered to be the group IV–VI transition metals. The matrix may be based upon one or more compounds of these metals taken in combination. Some particularly preferred early transition metals used in the practice of the present invention comprise titanium, vanadium, and tungsten. The ceramic compounds of the transition metal or metals are preferably nitrides, carbides and oxides taken either singly or in combination, for example as carbonitrides, oxynitrides and other such compounds or mixtures. In general, oxygen is a minor component of the ceramic material, and nitrogen or carbon is always present.

The second phase is comprised of at least one member chose from the group Sn, Sb, Bi, Pb, Ag, In, Si, and Ge. This second phase material is most preferably comprised of a major portion of a first member of the group alloyed with a relatively minor amount of a second member. Inclusion of the alloying agent has been found to reduce mechanical degradation of the resultant material thereby accommodating volume changes associated with charge and discharge cycles. In addition, the alloying agent also provides some electrochemical contribution in most instances. One specifically preferred material for the second phase comprises tin, and in particularly preferred embodiments, the tin is alloyed with relatively minor amounts of antimony. In other preferred embodiments the second phase comprises antimony, which may be alloyed with minor amounts of tin or other materials from the group.

Within the context of this disclosure, a number of compositions will be readily apparent to one of skill in the art. In some specific embodiments, the material of the present invention can be defined by the general formula:

$T_x A_{1-x} B_y O_z$.

In this formula T is one or more group IV–VI transition metals; A is one or more of Sn, Sb, Bi, Pb, Ag, In, Si, and Ge; B is carbon or nitrogen taken either singly or in combination, and O is oxygen. In the foregoing formula, the subscripts all refer to atomic percentages of the components; and, x is in the range of 0.4–0.6; y is in the range of 0.2–0.6, and z is in the range of 0.0–0.3. It is generally preferred, that atomic percentages of carbon, nitrogen and oxygen approximate the atomic percentage of the transition metal. Hence, y+z will be in the range of 0.8x–1.2x.

In those instances where the component A includes two members from the group, the second member of the group is an alloying agent, and is present in a relatively small amount, for example up to 0.3 atomic percent, and more preferably in the range of 0.01–0.05 atomic percent.

Some specifically preferred materials of the present invention comprise a matrix of titanium and nitrogen with a second phase of tin nanodispersed there through. In specifically preferred embodiments, the matrix will include relatively minor amounts of oxygen in addition to the nitrogen, and the tin is alloyed with relatively small amounts of antimony. Another preferred material comprises a matrix of vanadium and carbon, generally with relatively minor amounts of oxygen, and a second phase of tin, preferably alloyed with relatively minor amounts of antimony. Another preferred material system is comprised of a matrix of vanadium and nitrogen, with relatively small amounts of oxygen, and a second phase tin, preferably alloyed with relatively small amounts of antimony. Yet another preferred material comprises a matrix of titanium and carbon, generally with relatively small amounts of oxygen, and a second phase of tin, preferably alloyed with relatively small amounts of antimony. In other preferred materials, the titanium or vanadium is substituted for by tungsten. In yet other preferred systems, the tin is substituted for by antimony, and in such instance, relatively small amounts of tin or other members of the group may be present as an alloying agent in combination with the antimony.

There are a variety of techniques which may be employed to fabricate the materials of the present invention. One particularly preferred route comprises a sol-gel process wherein various components of the material are mixed together in a liquid form and converted into a gel, which is subsequently dried and appropriately reacted to form the finished material. For example, in one illustrative process, a titanium alkyl such as tetra butyl titanium is mixed with a tin compound, such as tin tetrachloride or tin methoxide, so as to form a gel comprising a solvated network of Ti and O having regions of Sn therein. This material is dried to produce a titanium oxygen matrix with a nanodispersion of tin therein. This material may be subsequently converted to nitrides or carbides, in whole or in part, by appropriate treatment with carburizing and/or nitriding atmospheres. It is to be understood that yet other processes for the fabrication of the materials of the present invention may be implemented.

What is claimed is:

1. A lithium ion battery wherein the anode thereof comprises a multi-phase material comprising:
   a first phase which is a ceramic matrix material comprising a compound of a group IV–VI transition metal, said compound being selected from the group consisting of nitrides, carbides, oxides, and combinations thereof;
   a second phase comprising material selected from the group consisting of: Sn, Sb, Bi, Pb, Ag, In, Si, Ge, and combinations thereof, said second phase being nanodispersed in said matrix.

2. The battery of claim 1, wherein said second phase of said multi-phase material includes Sn.

3. The battery of claim 1, wherein said transition metal comprises Ti or V.

4. The battery of claim 1, wherein said nanodispersed phase of said multi-phase material comprises regions having a size in the range of 2,000–5,000 angstroms.

* * * * *